(12) United States Patent
Succi et al.

(10) Patent No.: US 9,696,405 B1
(45) Date of Patent: Jul. 4, 2017

(54) ACOUSTIC HOSTILE FIRE INDICATOR

(71) Applicant: BAE Systems Information And Electronic Systems Integration Inc., Nashua, NH (US)

(72) Inventors: George Succi, Merrimack, NJ (US); Eldon M. Sutphin, Merrimack, NH (US); Edward C. Real, Nashua, NH (US); Philip J. Haney, Merrimack, NH (US); William O. Devine, Stoneham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 884 days.

(21) Appl. No.: 14/012,495

(22) Filed: Aug. 28, 2013

Related U.S. Application Data

(63) Continuation-in-part of application No. 12/632,441, filed on Dec. 7, 2009, now abandoned.

(60) Provisional application No. 61/193,544, filed on Dec. 5, 2008.

(51) Int. Cl.
*G01S 3/80* (2006.01)
*G01S 3/786* (2006.01)
*H04R 1/40* (2006.01)

(52) U.S. Cl.
CPC .............. *G01S 3/80* (2013.01); *G01S 3/7864* (2013.01); *H04R 1/406* (2013.01); *H04R 2201/401* (2013.01)

(58) Field of Classification Search
None
See application file for complete search history.

(56) References Cited

U.S. PATENT DOCUMENTS

| | | | |
|---|---|---|---|
| 6,198,693 B1 * | 3/2001 | Marash | G01S 3/8083 342/417 |
| 6,215,731 B1 | 4/2001 | Smith | |
| 6,621,764 B1 * | 9/2003 | Smith | F41H 11/00 367/128 |
| 7,732,769 B2 | 6/2010 | Snider et al. | |
| 2007/0125951 A1 * | 6/2007 | Snider | G06K 9/00771 250/363.03 |

(Continued)

OTHER PUBLICATIONS

Maher, Robert C. "Modeling and Signal Processing of Acoustic Gunshot Recordings," Proc. IEEE Signal Processing Society 12th DSP Workshop, pp. 257-261, Sep. 2006, Jackson Lake, WY.

*Primary Examiner* — Alexander Satanovsky
*Assistant Examiner* — Brent A Fairbanks
(74) *Attorney, Agent, or Firm* — Sand & Sebolt, LPA

(57) ABSTRACT

A system and method for detecting the trajectory of a projectile is presented. One system includes a flash detection sensor, an acoustic sensor, an optical sensor and a processor logic mounted on a vehicle. The flash detection sensor detects a flash of a projectile being launched. The acoustic sensor detects when a blast wave associated with the firing of the projectile reaches the vehicle. The optical sensor takes two or more images of the same projectile. The images are typically not in the visible light spectrum. The processor logic calculates a trajectory of the projectile based on the images and data collected by the acoustic sensor associated with the blast wave. The processor logic may generate a warning signal to warn an operator of the vehicle about the projectile.

17 Claims, 8 Drawing Sheets

(56) References Cited

U.S. PATENT DOCUMENTS

2010/0278387 A1\* 11/2010 Agurok .................. F41H 13/00
382/103

\* cited by examiner

ACOUSTIC HOSTILE FIRE INDICATOR

CROSS REFERENCE TO RELATED APPLICATION

This application claims priority from U.S. application Ser. No. 12/632,441, filed Dec. 7, 2009; that claims priority from U.S. Provisional Application Ser. No. 61/193,544, filed Dec. 5, 2008; the disclosures of which are incorporated herein by reference.

BACKGROUND OF THE INVENTION

1. Field of Invention

The current invention relates generally to apparatuses, systems and methods for tracking objects. More particularly, the apparatuses, systems and methods relate to detecting the location of a source of audible and thermal energy, and, more particularly, the present invention relates to determining the trajectory of a projectile from a moving vehicle such as a helicopter.

2. Description of Related Art

In certain circumstances and areas, such as within a combat zone, it becomes necessary to detect when a projectile is being directed at you. Early and accurate detection allows one to avoid the projectile if possible, and to move to a safer location to avoid being impacted with further projectiles. It is further beneficial to determine the location from where the projectile originated, and to do so quickly and accurately.

One known system for detecting inbound projectiles is known as the Common Missile Warning System ("CMWS"). This system senses ultraviolet missile detection data from electro-optic missile sensors and sends a missile alert signal to on-board avionics. The CMWS can function as a stand-alone system with the capability to detect missiles and provide audible and visual warnings to pilots. It can be used in conjunction with other systems, for example it can activate expendables to decoy/defeat infrared-guided missiles. What is needed is a better system of projectile detection that may be used independently or in conjunction with existing detection systems.

BRIEF SUMMARY OF THE INVENTION

In one aspect, the invention may provide a system configured for mounting on a vehicle for detecting a projectile; the system comprising: a flash detection sensor configured to detect a flash of a projectile being launched; an acoustic sensor configured to sense when a blast wave associated with the firing of the projectile reaches the vehicle; an optical sensor configured to take images of the same projectile, wherein the images are not in the visible light spectrum; and processor logic configured to calculate a trajectory of the projectile based on the images and data collected by the acoustic sensor associated with the blast wave, wherein the processor logic is configured to generate at least one warning signal to warn an operator of the vehicle about the projectile.

In another aspect, the invention may provide a method comprising: at a vehicle, detecting a launch of a projectile; at the vehicle, capturing at different times a plurality of different images of the moving projectile in a non-visible portion of the frequency spectrum; at the vehicle, determining a time that a sound blast caused by the launch reaches the vehicle; at the vehicle, determining a trajectory of the projectile based on the plurality of images and the time that the sound blast reaches the vehicle; and at the vehicle, determining whether to generate an alarm based on the trajectory.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
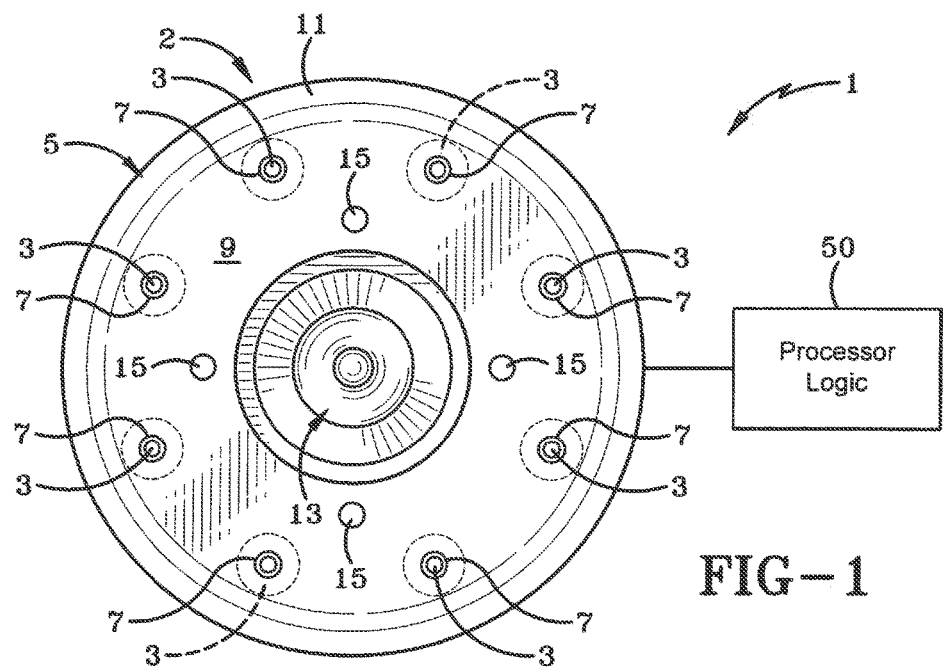
FIG. 1 is a front elevation view of a sample system for detecting a moving object.

FIG. 1 illustrates a sample embodiment of a system 1 that provides for the detection of the location of shooters with respect to a platform that may be moving, such as a helicopter or fixed-wing aircraft. The system 1 detects the acoustic emissions of a weapon being fired, and accurately determines the location of the shooter. In one embodiment, the acoustic sensor system 1 is used in conjunction with existing detection systems, such as CMWS. The system 1 includes a sensor device 2 which is preferably positioned on the outer surface of the vehicle. The sensor device 2 includes an array of microphones 3 that are placed within a system housing 5. The microphones 3 preferably are positioned in a circular array. Holes or openings 7 are formed along a front surface 9 of the housing 3 to allow external sound to reach the microphones 3. The system housing 5 is generally round or circular as viewed from the front. Housing 5 has a flat annular central wall which defines flat annular circular front surface 9 with a curved annular side wall 11 which curves rearwardly and outwardly from the outer perimeter of the central wall. The sensor device 2 can also include an optical sensor 13 preferably mounted in the center of the system housing 5 and secured to the central wall, which extends radially outwardly from sensor 13. The system housing 5 can also optionally have one or more screw holes 15 or other mounting structures formed in it or attached to it.

The system 1 further includes processor logic 50 (FIG. 5) to process the information detected by the microphones and is discussed in more detail later. "Logic", as used herein, includes but is not limited to a processor (e.g., microprocessor), hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Figure 2:
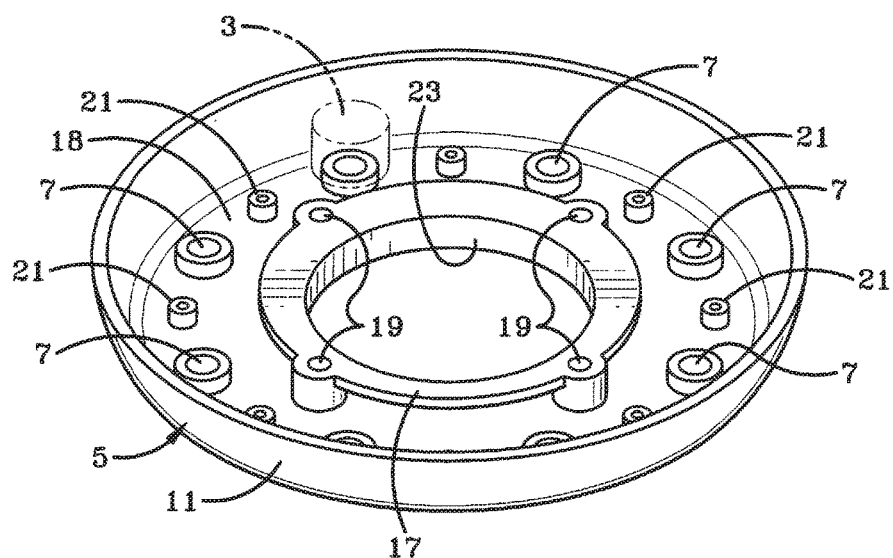
FIG. 2 is a rear and side perspective view of the system housing for a microphone array.

The system housing 5 protects the microphones 3 and the associated electronics while also retaining the microphones 3 in the appropriate location. As shown in FIG. 2, there is a round annular flange 17 that extends outwardly from a flat annular back internal surface 18 of the central wall of system housing 5. One or more holes 19 can be formed in the flange 17 to allow mounting sensor 13 to the flange 17. Additionally, one or more mounting protrusions 21 can be formed extending from the back surface 18 of the central wall of system housing 5 to allow the microphones 3 and other logic to be mounting to the system housing 5. Flange 17 may be generally round and annular with a central middle opening 23, which may be circular.

Figure 3:
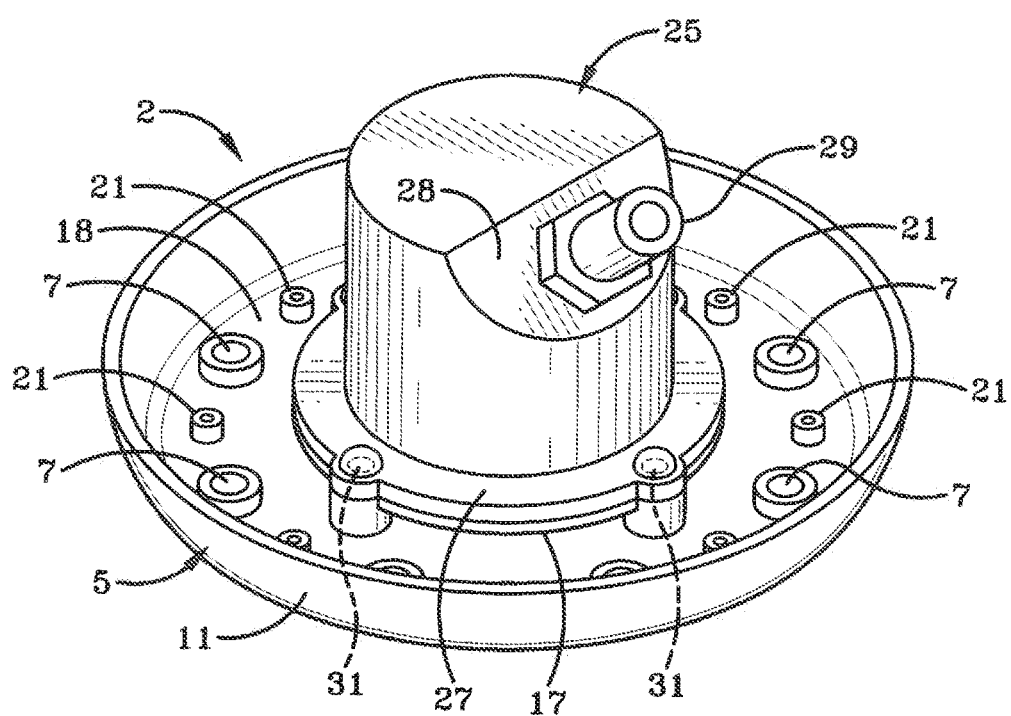
FIG. 3 is similar to FIG. 2 and shows an optical housing attached to the system housing.

FIG. 3 illustrates an example partially assembled back view of the system housing 5. An optical sensor housing 25 is shown mounted to the system housing 5. Housing 25 has a cylindrical sidewall having a cylindrical outer surface; a flat rear or back wall which is generally circular and has a flat rear surface which intersects the rear end of the cylindrical outer surface; and a flat side surface 28 which angles forward and laterally form a straight intersection with the rear surface to an arcuate intersection with the cylindrical outer surface. The optical sensor housing 25 has a circular annular lower flange 27 that extends outward from the front of the cylindrical outer surface of optical sensor housing 25. The optical sensor housing 25 can be mounted to the system housing 5 by mounting the optical sensor housing flange 27 to the housing flange 17. For example, it can be mounted to the system housing 5 with one or more fasting devices passing through holes 31 in flange 27 and holes 19 in flange 17 of system housing 5. The optical sensor housing 25 can also have an opening from which a connector 29 extends. For instance, connector 29 may extend rearwardly and laterally outwardly from flat surface 28. The connector 29 passes signals from the sensor device 2 to other electronic equipment such as the processor logic 50.

Figure 4:
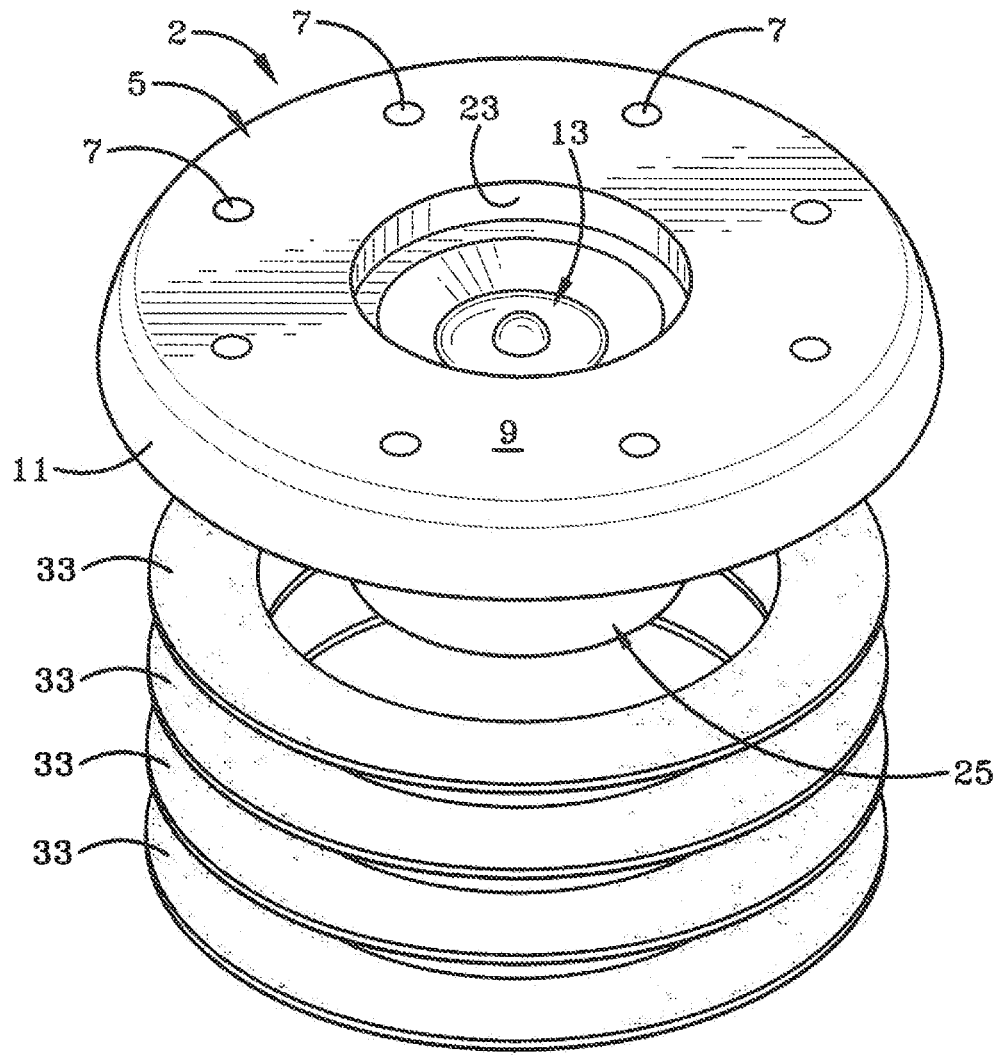
FIG. 4 is an exploded front and side perspective view showing internal components of the sample system.

FIG. 4 illustrates an exploded view of the microphone array of FIG. 1 in position with a CMWS system. In this illustrated arrangement, the housing is positioned on an outer periphery of the detection components. The sensor device 2 can include one or more spacers 33 that may be gaskets, cushions and/or other devices for mounting the sensor device 2 to a vehicle.

Electronic logic 50 (FIG. 5) may include filters to block or remove background noise and other unwanted data. Such equipment may also include processors to match the detected acoustic data to known or expected acoustic profiles. Such equipment may also include processors to perform calculations to determine the angle of arrival ("AOA") and time of arrival ("TOA") of the ordnance. Such equipment may also include signaling electronics to deliver the detected and calculated data to the vehicle operator and/or other personnel. The system 1 may make use of alarming equipment already on board the vehicle, such as that associated with the CMWS system. The electronic logic 50 may also be positioned within the annular system housing 5 of the sensor device 2. Thus, the entire inventive system is small and light, weighing only a few pounds, minimizing installation and operational burden to the vehicle.

Figure 5:
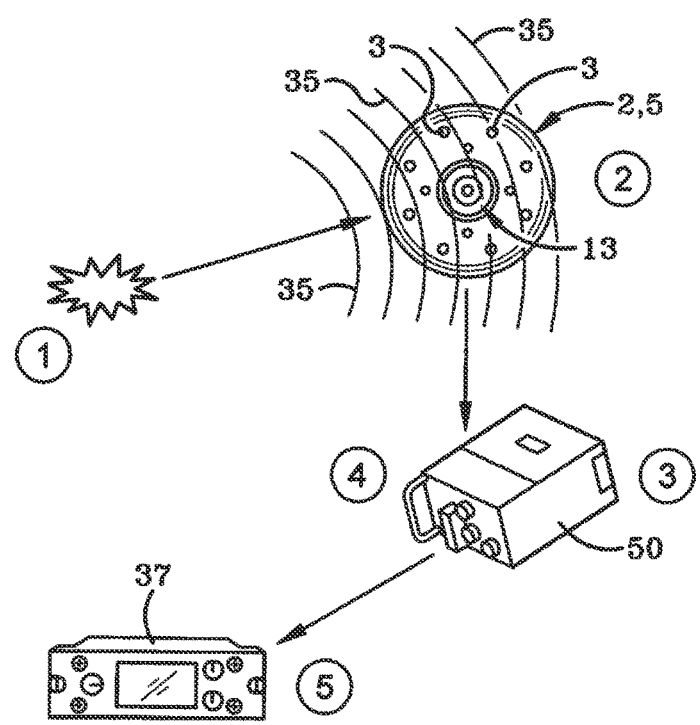
FIG. 5 shows an exemplary scenario of how the sample system can be used.

FIG. 5 shows an exemplary scenario of how the preferred embodiment of the system 1 may be used. At point 1, a weapon is fired. The microphones 3 of the sensor device 2 later detect the shock wave 35 generated by the ordnance as it passes through the air, at point 2. Once the acoustic data has been received, it is processed, at point 3 by the electronic logic 50. Exemplary processing steps include filtering noise from the measured data, convolving the data to remove statistical scatter, determining the timing of measurement for each microphone within the array, and calculating the position of the shooter. This determined information, which can be used in conjunction with information processed by other systems of the vehicle, at point 4, is then provided to the vehicle operator on a display 37, at point 5.

Figure 6:
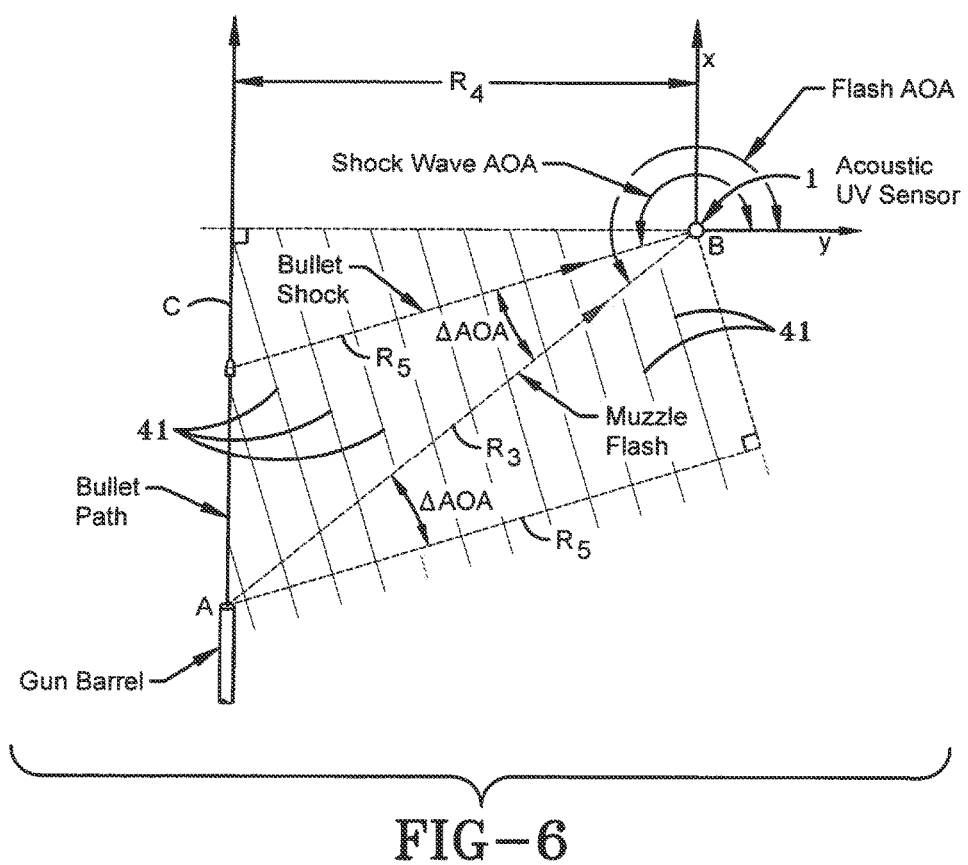
FIG. 6 shows a schematic illustrating how the range to a shooter is determined.

FIG. 6 shows an example schematic diagram of how the range to a shooter can be determined. In this illustrated example, the ordnance is fired from a weapon (e.g. a gun barrel) illustrated in the lower left corner of the illustration at point A. The vehicle and sensor system 1 are positioned in the upper right corner of the illustration at point B. While the projectile 39 is shown traveling vertically upwards in the figure in the direction of Arrow C, the system may be used regardless of the direction of travel of the ordnance and/or the vehicle. The flash generated by the firing of the projectile is detected by the ultraviolet sensors 13 (FIGS. 1, 4) of the CMWS, which determines the ADA and TOA of the flash. The acoustic emissions 41 of the traveling ordnance are detected by the system 1, which calculates the ADA and TOA of the ordnance. Together, this data allows accurate computation of the range to the weapon location:

$$\text{Range to weapon} = R_3$$
$$= \frac{R_5}{\cos(AOA_{flash} - AOA_{shock})}$$
$$= \frac{c \cdot (TOA_{shock} - TOA_{flash})}{\cos(AOA_{flash} - AOA_{shock})}$$
$$= \frac{c \cdot \Delta TOA}{\cos(\Delta AOA)}$$

In the above equations, c is the speed of sound. Thus, by measuring both the optical and acoustic measurements of the ordnance, not only the direction to the shooter but also the distance to the shooter is determined. These equations were described by R. C. Maher in "Modeling and Signal Processing of Acoustic Gunshot Recordings," Proc. IEEE Signal Processing Society 12th DSP Workshop, pp. 257-261, September 2006, Jackson Lake, Wyo.

While the above discussion refers to muzzle blast, the second signal may be detected via electro-optic infrared detection. This information will be used in conjunction with the acoustic detection of the shot as described above to determine the location of the shooter.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 7:
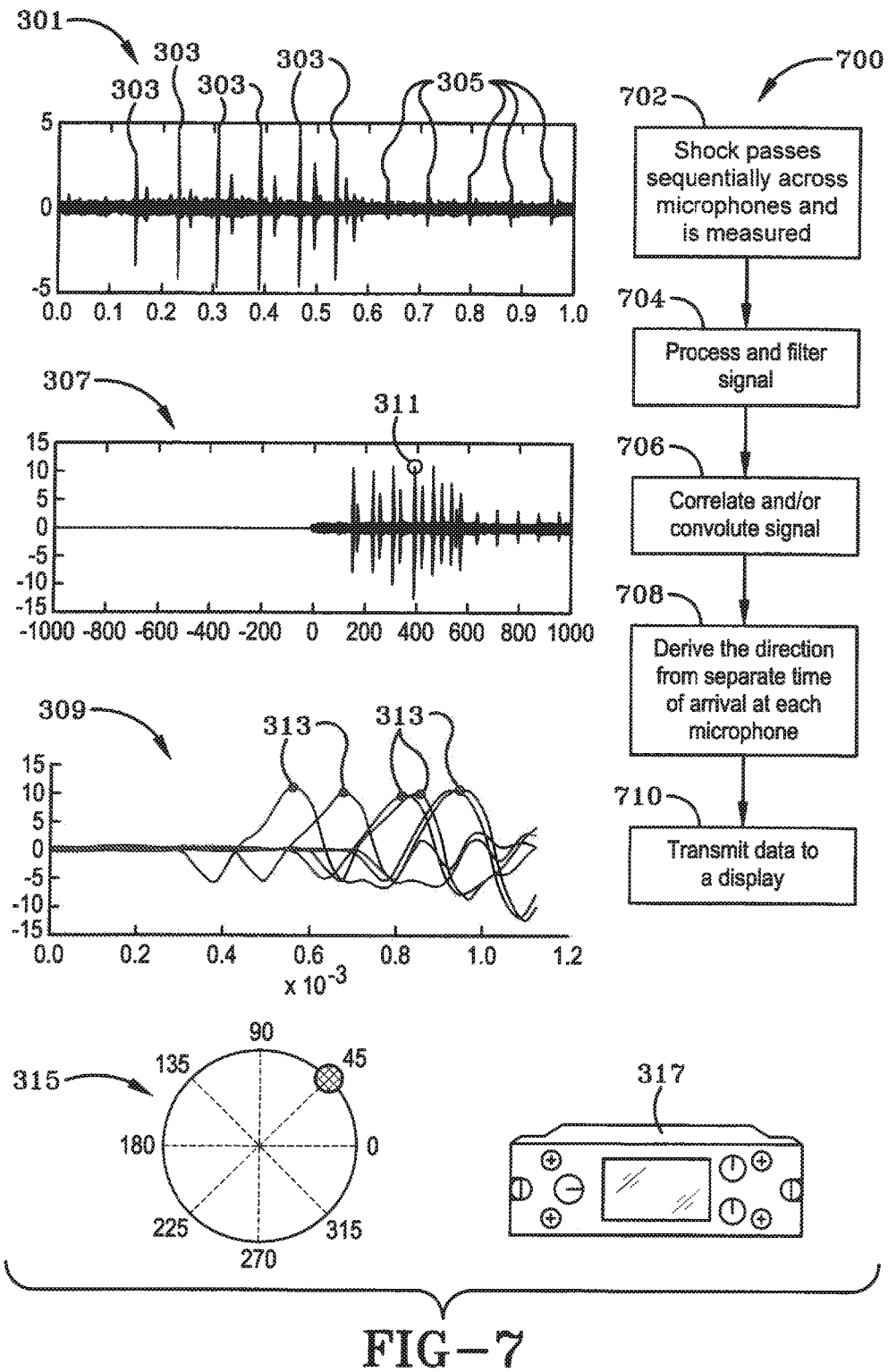
FIG. 7 illustrates an example processing chain of the sample embodiment.

FIG. 7 illustrates an example method 700 of a processing chain of a sample embodiment. Initially, acoustic data of an inbound ordnance is measured, at 702. The top chart 301 of the measured acoustic data reveals six major spikes 303. Each spike 303 corresponds to the ballistic shock wave created by the ordnance moving at supersonic speed. Thus, chart 301 of FIG. 7 shows that six shots were fired. Each of these six major spikes 303 is followed by a smaller peak shortly thereafter. These shorter peaks correspond to echoes of the shock waves bouncing off the ground. Furthermore, additional peaks 305 are shown as being measured later in time. This second set of smaller peaks 305 corresponds to the acoustic energy of the shot being fired, which arrived at the microphone array after the fast traveling ordnance.

After the data is measured, it is processed or filtered, at 704, to remove background noise. The processed or filtered signal is shown in the second chart 307 of FIG. 7. One source of background noise is the sounds generated by operation of the vehicle itself. Another major source of background noise is air flow, caused by vehicle movement, against the microphones. Thus, the microphones should be selected or adjusted to minimize this noise source as much as possible. The data of FIG. 7 was measured in a hovering helicopter, which significantly reduced the amount of air flow noise.

The processed signal is then correlated or convoluted, at 706. This is also known as match filtering and compares the processed signal to known or expected acoustic profiles for ordnance to further remove noise such as statistical scatter from the data. The result of this convolution process is a substantially clear acoustic signal of the ballistic shock wave from which calculations can be made. The third chart 309 in the sequence of FIG. 7 is a magnified view of the encircled fourth peak 311 of the second chart of the sequence after convolution. This chart 309 shows the ballistic shock measurement made by each microphone within the array for a single bullet. The peak of each microphone's measurement has been noted at 313, indicating the time at which each microphone within the array sensed the ballistic shock.

The difference in timing among the microphones within the array indicates from which direction the projectile came. Thus, the direction to the weapon and shooter is determined. The method 700 derives the direction from the separate times of arrival at each microphone, at 708. This angular calculation is illustrated in the fourth chart 315 in the sequence of FIG. 7. Here, it has been determined that the measured shots approached the vehicle at a 45° angle. This data is then transmitted to a display 317, at 710, so that the driver of the vehicle can read and react to it.

In another embodiment, the acoustic sensor system is used without the input of any other detection system. With this design, multiple arrays are used to provide multiple signals that are triangulated to yield the location of the weapon and the inbound ordnance.

Figure 8:
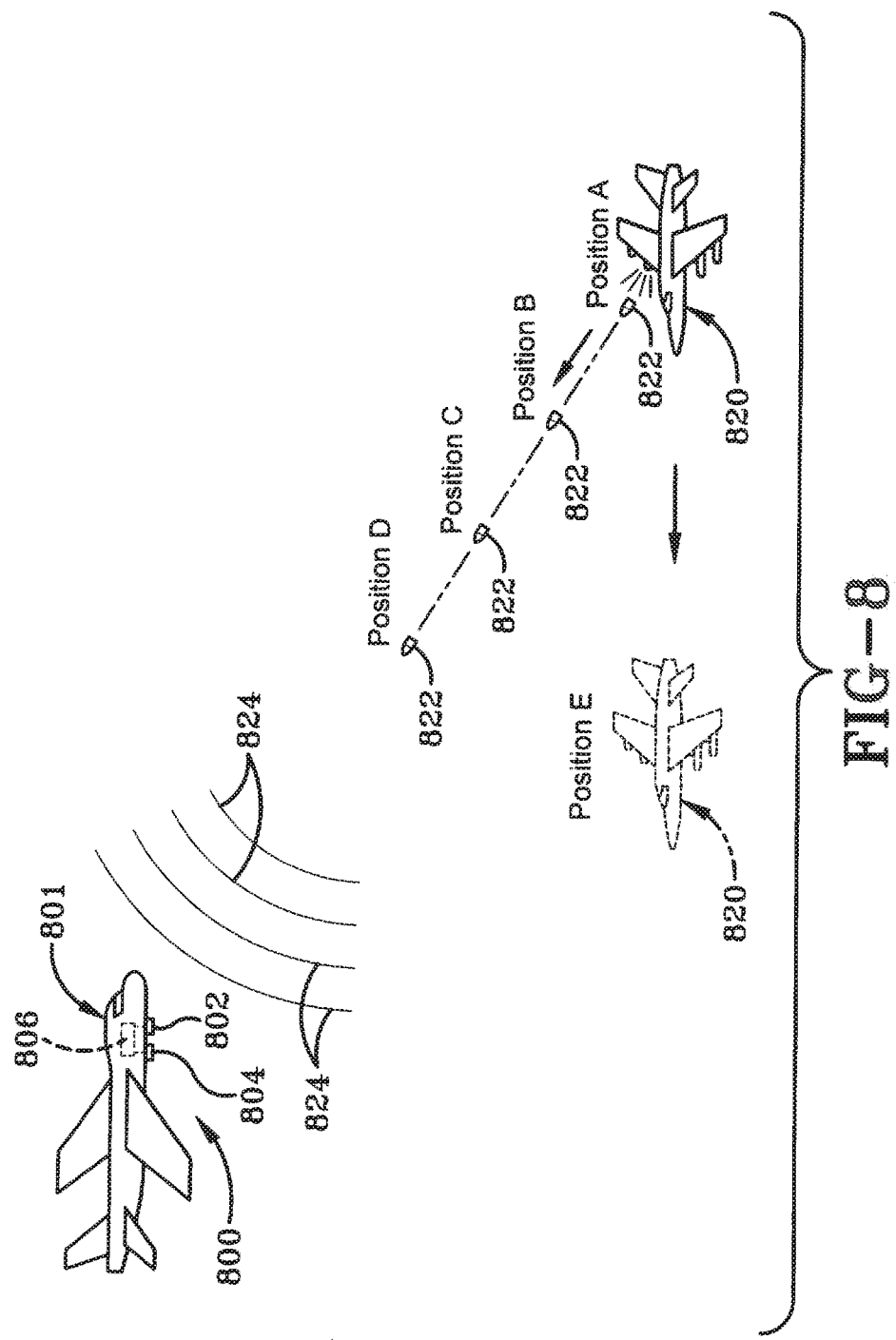
FIG. 8 illustrates an example diagram of a second configuration of a system for determining the trajectory of a moving object.

FIG. 8 illustrates a second configuration of a sample system 800 for detecting a projectile 822 that takes multiple (two or more) optical images of projectile 822. In this example figure, the system 800 is mounted to an aircraft 801. The system 800 includes an optical sensor 802, an acoustic sensor 804 and a processor logic 806. The acoustic sensor 804 can be similar to the array of microphones 3 in the sensor device 2 discussed above. The acoustic sensor 804 has an array of microphones that may be in a circular array or another type of physical arrangement. In FIG. 8, the optical sensor 802 and the acoustic sensor 804 are illustrated as being separate components but they can also be implemented in one device similar to the sensor device 2 discussed earlier.

The optical sensor 802 in the sample embodiment has the ability to take rapid images of projectiles as they travel, sometimes at high speeds. In one embodiment, optical sensor 802 does not take images in the visible spectrum. Rather, as understood by those of ordinary skill in the art, the optical sensor 802 takes images in a non-visible portion of the spectrum that still allows data associated with the flight of a projectile to be acquired from images taken by the optical sensor 802. Each image taken by the optical sensor 802 provides for a way to determine an elevation value and an azimuth value of a projectile in the image with respect to the image.

Having described the components of the system 800 for detecting a projectile 822, its operation will now be described. FIG. 8 illustrates an example enemy aircraft 820 that has launched a projectile 822. In this particular case, a bullet 822 from a gun mounted on a wing of the enemy aircraft 820 is fired toward the friendly airplane 801. Optical sensor 802 can detect a muzzle flash from the gun just as the projectile is fired from the gun at position A. In other embodiments, a separate third sensor such as an infrared sensor can detect the muzzle flash. Once the muzzle flash is detected, the optical sensor 802 can begin taking a series of images of the projectile 822. For example, images can be taken of the projectile at positions B, C and D. The data of these images is input to a logic such as the processor logic 806 where the processor logic can determine an azimuth and an elevation of the bullet at each of the positions B-D. Eventually the shock waves 824 of the blast will reach the acoustic sensor 804 and this sensor detects these waves as described earlier with respect to sensor device 2.

In one configuration, the data collected by the optical sensor 802 and the acoustic sensor 804 can be preprocessed before it is delivered to the processor logic 806 (e.g., ECU). As understood by those of ordinary skill in the art, the detected signals can be matched to a bank of filters to, in part, derive a sensor space angle-of-arrival (AOA) and a delta time-of-arrival (TOA). The TOA and AOA can then be provided to the processor logic 806.

The processor logic 806 can then use the TOA, AOA and azimuth and the elevation pair values taken at the different positions to begin to calculate the trajectory of the bullet 822. The trajectory can be calculated in any way as understood by those of ordinary skill in the art. Those of ordinary skill in the art will appreciate that determining the trajectory can include converting acoustic sensor reports to platform stabilization coordinates using existing EOMS-to-platform mapping data. Additionally, HFI track file processing can mimic existing EOMS track processing. Calculating the trajectory can include matching the bullet shock wave to the multiple sets of azimuth and elevation data pairs. Once the trajectory is known, familiar warnings may be projected on displays in airplane 801. For example, an indicator of the projectile can be displayed on an existing missile warning quadrant indicator or a variety of verbal messages can be generated.

Figure 9:
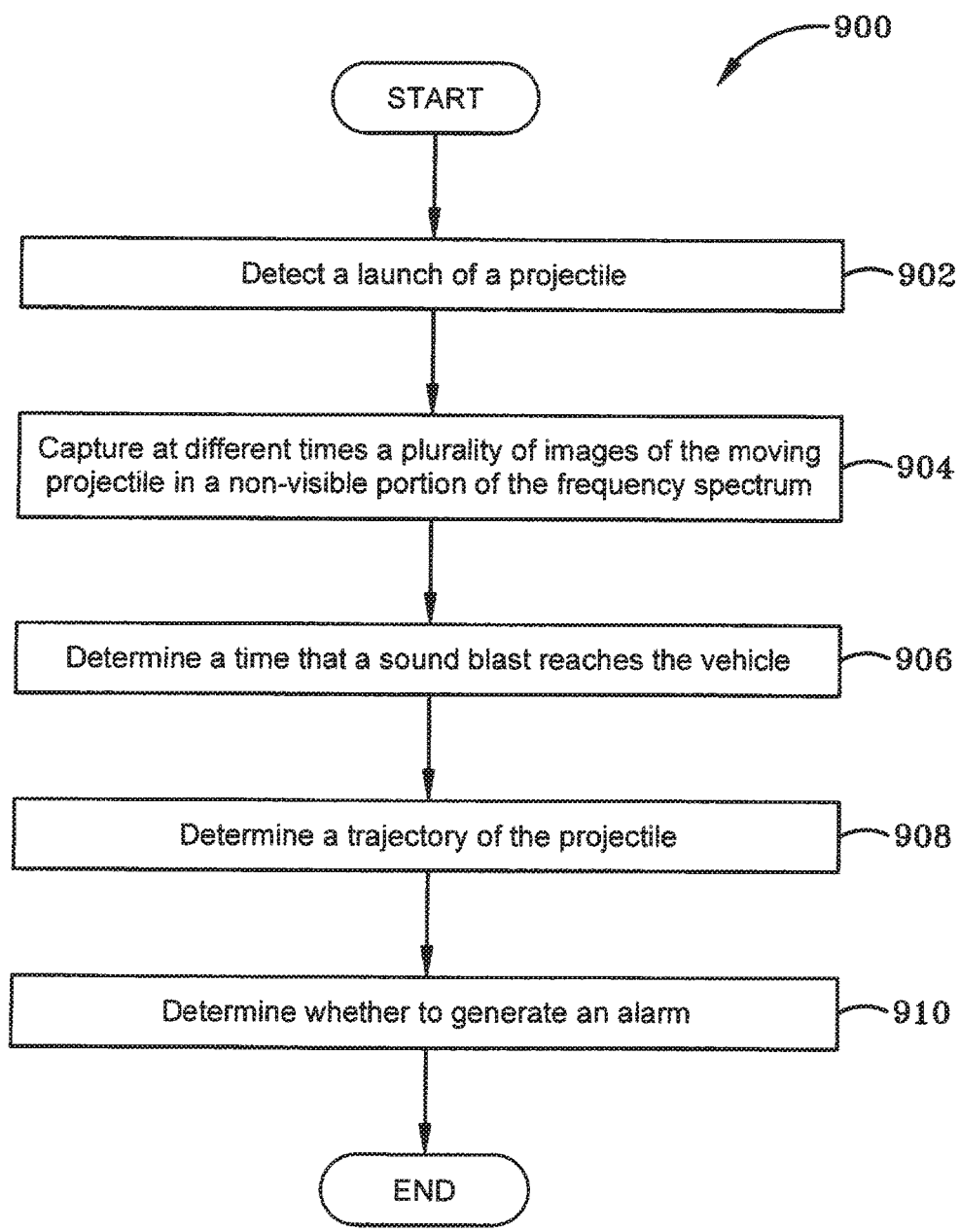
FIG. 9 is a flowchart of a method of determining the trajectory of a moving object.

FIG. 9 illustrates one way of determining the bullet's trajectory. This Figure is very similar to FIG. 6 discussed above except that instead of merely calculating a range to a shooter as in FIG. 6, method 900 calculates the actual trajectory of the bullet based, at least in part, on the multiple optical images of the bullet. FIG. 6 did not have multiple optical images of the bullet to derive azimuth and elevation pairs of the bullet from different places along its path.

All of the actions of method 900 take place at a moving vehicle that may be an aircraft. The method 900 begins by detecting a launch of a projectile, at 902. This can be accomplished as discussed above by detecting a flash of the launch with an optical sensor or in other ways. At different times, a plurality of different images of the moving projectile are captured, at 904, in a non-visible portion of the frequency spectrum. The method 900 also determines a time that a sound blast caused by the projectile reaches the vehicle, at 906. This can be detected with one or more acoustic sensors as discussed above. At 908, the trajectory of the projectile is determined based, at least in part, on the plurality of images and the time that the sound blast reaches the vehicle. As discussed above, the trajectory can be determined based on azimuth values and elevation values extracted from the images and in other ways as understood by those of ordinary skill in the art. Once the trajectory is known, it is possible to follow that trajectory back to the shooter and determine whether to generate an alarm, at 910. As discussed above, the alarm can be any audio and/or visual indicator to an operator of the vehicle that a projectile is headed toward, wherein the projectile is typically fired by a hostile enemy.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A system configured for mounting on an aerial vehicle for detecting an airborne projectile launched toward the vehicle; the system comprising:

an annular housing including an annular central wall, a flat annular front surface and a flat annular back surface connected to the central wall, and a curved sidewall extending from an outer perimeter of the back surface, wherein the flat annular front surface defines an array of holes and the flat annular back surface is flush-mounted to the vehicle;

an optical sensor housing including a cylindrical sidewall, a back wall, a flat side surface which angles forwardly and laterally from the back wall, wherein the optical sensor housing is attached to the annular housing;

an acoustic sensor having an array of microphones disposed in the array of holes formed in the flat annular front surface of the annular housing such that the microphones of the array of microphones are recessed from the flat annular front surface and configured to sense when a shock wave associated with the firing of the projectile reaches the vehicle;

an optical sensor mounted in the optical sensor housing configured to take images of the projectile in an ultraviolet light spectrum; and processor logic configured to calculate a trajectory of the projectile based on the images and data collected by the acoustic sensor associated with the shock wave, wherein the processor logic is configured to generate at least one warning signal to warn an operator of the vehicle about the projectile.

2. The system of claim 1 wherein the processor logic is configured to (a) extract an azimuth and an elevation of the projectile from each image of the projectile taken by the optical sensor; and (b) calculate a trajectory of the projectile based on the azimuth and an elevation of each image.

3. The system of claim 1 wherein the array of microphones are individual microphones equally spaced apart.

4. The system of claim 3 wherein the microphones are arranged in a circle.

5. The system of claim 4 wherein the optical sensor is in a center of the circle.

6. The system of claim 1 further comprising a flash detection sensor, wherein the flash detection sensor and the optical sensor are the same sensor.

7. The system of claim 1 wherein the annular housing further comprises:

an annular flange extending outwardly from the flat annular back surface, wherein the optical sensor housing is mounted on the annular flange.

8. The system of claim 1 wherein the projectile is a bullet fired from a gun.

9. The system of claim 1 further comprising:

a visual indicator configured to display at least what quadrant the projectile is in responsive to the trajectory of the projectile.

10. The system of claim 1 wherein the vehicle is an aircraft.

11. A method comprising:

at an aerial vehicle, detecting a launch of an airborne projectile launched towards the vehicle using a system including an annular housing, the annular housing including an annular central wall, a flat annular front surface and a flat annular back surface connected to the central wall, and a curved sidewall extending from the back surface, wherein the flat annular front surface defines an array of holes and the flat annular back surface is flush-mounted to the vehicle;

at the vehicle, capturing at different times a plurality of different images of the moving projectile in an ultraviolet light spectrum using the system including an optical sensor mounted in an optical sensor housing including a cylindrical sidewall, a back wall, a flat side surface which angles forwardly and laterally from the back wall, wherein the optical sensor housing is attached to the annular housing;

at the vehicle, determining a time that a shock wave caused by the launch reaches the vehicle using the system including an acoustic sensor having an array of microphones disposed in the array of holes formed in the flat annular front surface of the annular housing such that the microphones of the array of microphones are recessed form the flat annular front surface;

at the vehicle, determining a trajectory of the projectile based on the plurality of images and the time that the shock wave reaches the vehicle using the system including processor logic configured to calculate the trajectory; and at the vehicle, determining whether to generate an alarm based on the trajectory using the system including processor logic configured to determine whether to generate the alarm based on the trajectory.

12. The method of claim 11 further comprising:
extracting an azimuth and an elevation pair of data of the projectile from each of the images; and wherein the trajectory is determined based on the azimuth and elevation pairs of data.

13. The method of claim 11 wherein at least one of the plurality of images of the projectile is captured before the determining a time that a shock wave reaches the vehicle.

14. The method of claim 11 wherein determining a time that a shock wave reaches the vehicle further comprises:
receiving acoustic data at the array of microphones.

15. The method of claim 11 further comprising:
filtering the acoustic data to remove at least background noise to produce filtered acoustic data.

16. The method of claim 15 further comprising:
convoluting the filtered acoustic data with one or more known acoustic data profiles to produce convoluted data, and wherein the trajectory is based on the convoluted data.

17. The method of claim 11 wherein the projectile is a bullet and the vehicle is an airplane.

* * * * *